(12) United States Patent
Arai et al.

(10) Patent No.: US 9,382,926 B2
(45) Date of Patent: Jul. 5, 2016

(54) OIL PASSAGE CHANGE-OVER VALVE

(71) Applicant: KUBOTA CORPORATION, Osaka-shi, Osaka (JP)

(72) Inventors: Yasuhiko Arai, Sakai (JP); Toshiki Ichikawa, Sakai (JP); Tokio Sakata, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 440 days.

(21) Appl. No.: 13/792,657

(22) Filed: Mar. 11, 2013

(65) Prior Publication Data

US 2013/0263952 A1 Oct. 10, 2013

(30) Foreign Application Priority Data

Apr. 6, 2012 (JP) ................................. 2012-087259

(51) Int. Cl.
| | |
|---|---|
| *F15B 21/00* | (2006.01) |
| *E02F 9/22* | (2006.01) |
| *F16K 11/085* | (2006.01) |

(52) U.S. Cl.
CPC ............. *F15B 21/008* (2013.01); *E02F 9/2267* (2013.01); *F16K 11/0853* (2013.01); *Y10T 137/86718* (2015.04)

(58) Field of Classification Search
CPC ........... F15B 13/0402; F15B 2211/329; F15B 2211/3058; F15B 2211/6309; F15B 21/008; E02F 9/2267; F16K 11/0853; Y10T 127/86718
USPC ........................................................ 137/876
See application file for complete search history.

(56) References Cited

U.S. PATENT DOCUMENTS

| | | | | |
|---|---|---|---|---|
| 1,725,337 | A * | 8/1929 | Burkhard | 137/240 |
| 3,522,897 | A * | 8/1970 | Freedy | E02F 3/432 414/701 |
| 4,966,187 | A * | 10/1990 | Wah | 137/454.5 |
| 4,982,760 | A | 1/1991 | Mustaklem | |
| 5,709,247 | A * | 1/1998 | Hutton | 137/884 |
| 6,378,738 | B1 * | 4/2002 | Speaker et al. | 222/330 |
| 6,450,081 | B1 * | 9/2002 | Sorbel | 91/443 |
| 7,458,528 | B2 * | 12/2008 | Ridgeway et al. | 239/329 |
| 8,700,271 | B2 * | 4/2014 | Evenson | E02F 3/844 172/812 |

FOREIGN PATENT DOCUMENTS

| | | |
|---|---|---|
| CN | 1459534 A | 12/2003 |
| CN | 2898503 Y | 5/2007 |
| CN | 101225892 A | 7/2008 |

(Continued)

*Primary Examiner* — Nathaniel Wiehe
*Assistant Examiner* — Logan Kraft
(74) *Attorney, Agent, or Firm* — Birch, Stewart, Kolasch & Birch, LLP (57) ABSTRACT

An oil passage change-over valve allows an alternate communication from a first opening portion in one side a second and a third opening portion provided in another side to be changed over. A first opening portion is formed in one side of a valve body and the second and third opening portions are formed in another side of the valve body; a valve element within a valve hole of the valve body; and a communicating oil passage is formed in the valve element for alternately communicating the three opening portions. Inside the valve body, there are formed a first oil passage for connecting the valve hole with the first opening portion, a second oil passage for connecting the valve hole with the second opening portion, and a third oil passage for connecting the valve hole with the third opening portion deviated by 120 degrees from the first oil passage, respectively.

12 Claims, 5 Drawing Sheets

(56) References Cited

FOREIGN PATENT DOCUMENTS

| CN | 201827444 U | 5/2011 |
|---|---|---|
| DE | 3730419 A1 | 3/1989 |
| EP | 0638745 A1 | 2/1995 |
| JP | 45-036187 B | 11/1970 |
| JP | 10-169806 A | 6/1998 |
| JP | 3122224 B2 | 1/2001 |

* cited by examiner

OIL PASSAGE CHANGE-OVER VALVE

TECHNICAL FIELD

The present invention relates to an oil passage change-over valve for use in a working machine such as a back hoe, hydraulic excavator, wheel loader and the like.

BACKGROUND ART

As a conventional oil passage change-over valve, there has been used a three way valve device disclosed in, for example, Japanese Patent 3122224. In this three way valve device, a first opening portion is formed in one side of a valve body and a second opening portion and a third opening portion are provided in another side thereof, a valve element is rotatably provided inside a valve hole of the valve body, and a straight communicating oil passage is formed in this valve element for alternately communicating the first opening portion with one of the second opening portion and the third opening portion. Inside this valve body, there are formed a first oil passage for connecting the valve hole with the first opening portion, a second oil passage for connecting the valve hole with the second opening portion and a third oil passage for connecting the valve hole with the third opening portion.

In this three way valve device, the second oil passage and the third oil passage are separated by a thin partition and both of the passages are formed to be straight passages with their axial centers being in parallel and adjacent to those of the second and third opening portions.

SUMMARY OF INVENTION

Technical Problem

This conventional three way valve device is useful in such an operation of switching an oil passage in the alternate communication from the first opening portion to one of the second opening portion and the third opening portion by a slight rotation of the valve element, mixing fluids flowing in two oil passages with the mixing ratio adjustable, and the like. However, since there exists a state that the communication oil passage of the valve element extends over the two opening portions provided in one plane of the valve body, it becomes difficult to definitely and surely switch the communication to the two opening portions.

Therefore, an essential object of the present invention is to provide an oil passage change-over valve capable of solving such a conventional problem.

More specifically, the present invention is aimed to provide an oil passage change-over valve capable of definitely and surely switching an alternate communication from a first opening portion formed in one side to the second opening portion and the third opening portion formed in another side by forming a second oil passage and a third oil passage respectively deviated from a first oil passage by 120 degrees inside a valve body.

Solution to Problem

Technical means made by the present invention for solving the problem have specific features as following.

In a first aspect of the present invention, an oil passage change-over valve includes:

a valve body having a first opening portion formed in one side thereof and a second opening portion and a third opening portion formed in another side thereof;

a valve element rotatably provided within a valve hole of the valve body; and a communicating oil passage formed in the valve element for alternately communicating the first opening portion with one of the second opening portion and the third opening portion, wherein, inside the valve body, there are formed a first oil passage for connecting the valve hole with the first opening portion, a second oil passage deviated by 120 degrees from the first oil passage for connecting the valve hole with the second opening portion, and a third oil passage deviated by 120 degrees from the first oil passage for connecting the valve hole with the third opening portion.

In a second aspect of the present invention, axial centers of the second and third opening portions are positioned in parallel, and the second and third oil passages are arcuately bent from the valve hole toward the second and third opening portions, respectively.

In a third aspect of the present invention, the communicating oil passage of the valve element is bent by 120 degrees inside the valve element substantially in a chevron in an axial direction.

In a fourth aspect of the present invention, angle setting means is provided between an end portion in the axial direction of the valve element and the valve body for setting a rotation of the valve element by 120 degrees.

Advantageous Effects of Invention

According to the present invention, the alternate communication from the first opening portion formed in one side to the second opening portion and third opening portion formed in another side can be definitely and surely switched.

According to the first aspect of the present invention, since there are formed a second oil passage for connecting the valve hole with the second opening portion deviated by 120 degrees from a first oil passage for connecting the valve hole with the first opening portion, and a third oil passage for connecting the valve hole with the third opening portion deviated by 120 degrees from the first oil passage inside the valve body, a wide angle and space to the greatest extent possible can be taken from the first oil passage to the second and third oil passages, and even in the case where the second and third opening portions are formed in the same side, the alternate communication made by a rotation of the valve element 4 can be definitely and surely switched.

According to the second aspect of the present invention, since the second and third oil passages are arcuately bent from the valve hole toward the second and third opening portions, respectively, the second and third opening portions can be formed in the same side of the valve body with their axial centers being in parallel and adjacent to each other.

According to the third aspect of the present invention, since the communicating oil passage of the valve element is bent by 120 degrees inside the valve element substantially in a chevron in an axial direction, it becomes possible to surely communicate with the second and third oil passages deviated from the first oil passage by 120 degrees.

According to the fourth aspect of the present invention, since the angle setting means is provided between an end portion in the axial direction of the valve element and the valve body for setting a rotation of the valve element by 120 degrees, the change-over of the oil passage made by a rotation of the valve element (4) can be easily and surely performed.

DESCRIPTION OF EMBODIMENTS

The following describes an embodiment of the present invention with reference to the drawings.

Figure 4:
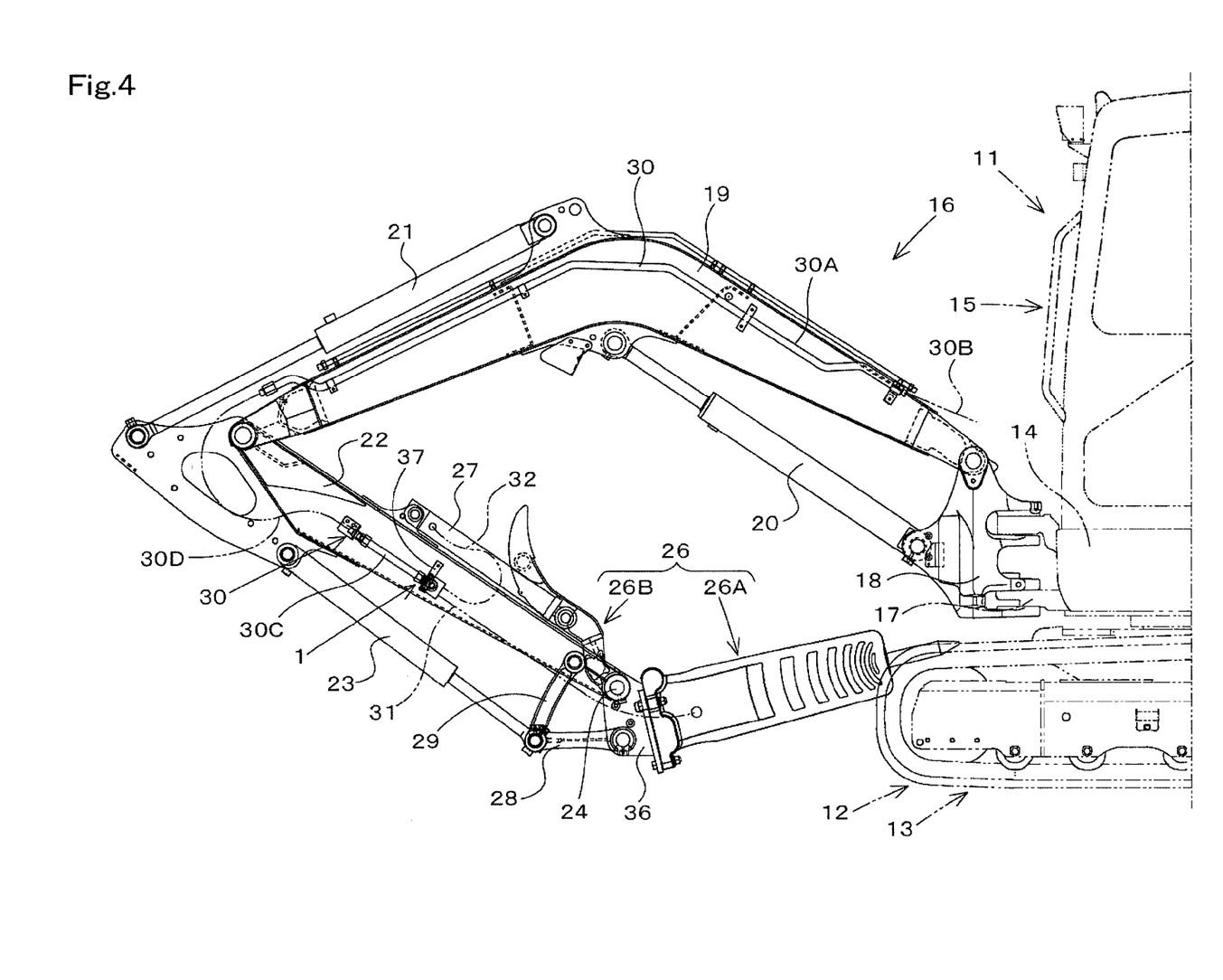
FIG. 4 is a side view of a working machine using an oil passage change-over valve.
Figure 5:
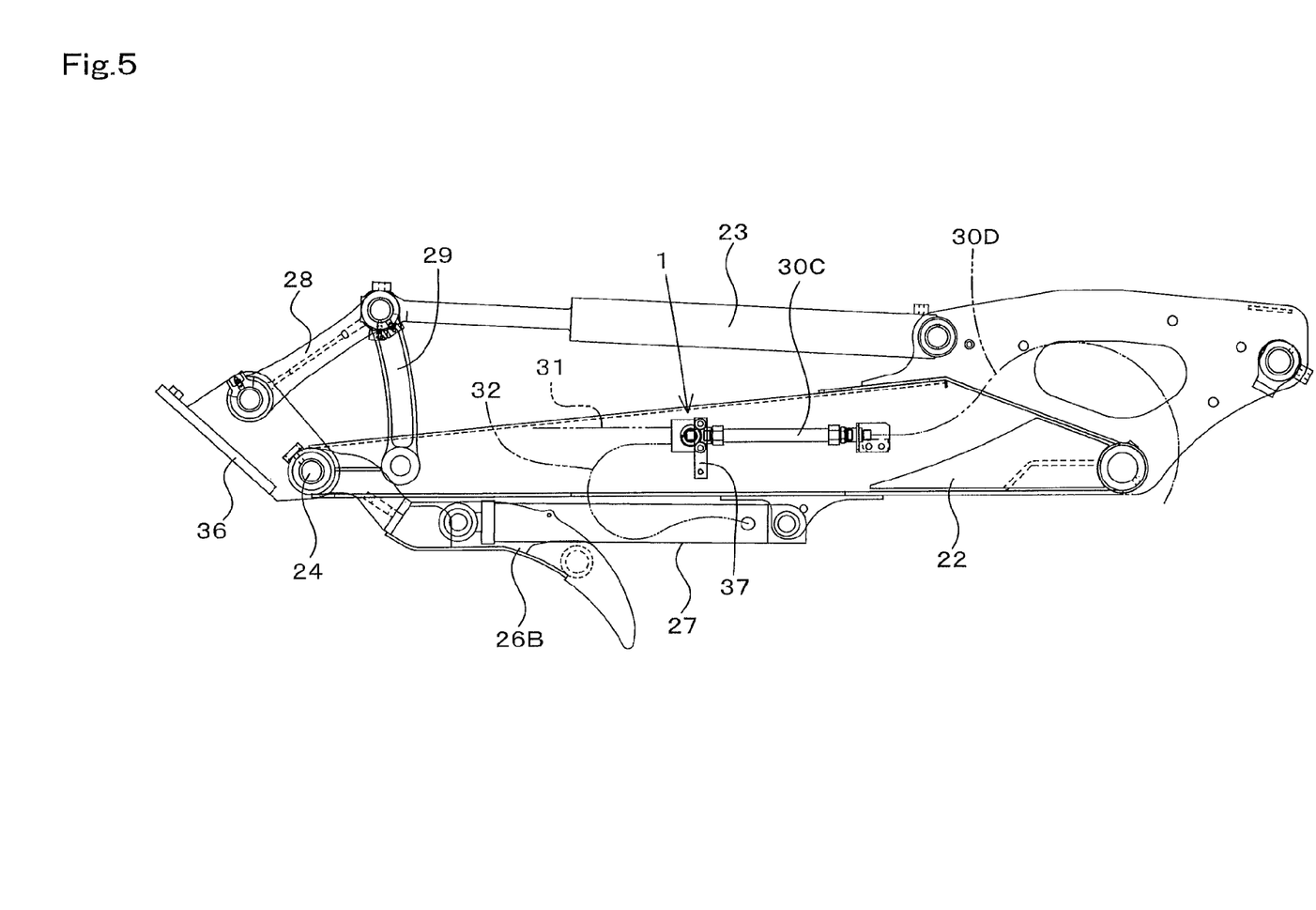
FIG. 5 is a side view of an essential part of the working machine using an oil passage change-over valve.

In FIGS. 4 and 5, a back hoe 11 is shown as an example of a working machine, wherein a rotating base 14 is rotatably supported about a vertical axis on a travelling machine body 13 including a crawler travelling part 12. An engine, a cabin 15 surrounding a driving seat, vehicle equipment and the like are mounted on the rotating base 14, and a working device 16 performing a work such as an excavation is attached to the front portion of the rotating base 14.

Referring to the working device 16, a swing bracket 18 is pivotally supported to a supporting bracket 17 in the front portion of the rotating base 14 in a laterally swingable manner about a vertical axis, and each of the proximal ends of a boom 19 and a boom cylinder 20 is pivotally supported to the swing bracket 18 in a vertically swingable manner about a transverse axis. An arm 22 driven by an arm cylinder 21 is pivotally supported to a tip end of the boom 19 in a vertically rotatable manner, and a working tool 26 rotated about a transverse axis (attitude-controlled) by a working tool cylinder 23 is coupled to a tip end of the arm 22 via a spindle 24.

As the working tool 26, a breaker (first working tool) 26A attitude-controlled by the working tool cylinder 23 and a thumb-shaped SAM (second working tool) 26B rotated by a SAM cylinder 27 are attached so that the working tool 26 is set in a state of performing a work using the breaker 26A while the SAM 26B is being attached without detaching the same.

A cylinder bottom side of the working tool cylinder 23 is coupled to an intermediate upper part of the arm 22, and an attachment member 36 is coupled to a tip end of the arm 22 via the spindle 24. A tip end of a cylinder rod of the working tool cylinder 23 is coupled to the attachment member 36 via a pressing link 28, and the tip end of the cylinder rod of the working tool cylinder 23 is also coupled to the arm 22 via a control link 29 so that the attachment member 36 is rendered to be rotatable about the spindle 24 by operating the working tool cylinder 23.

The breaker 26A is detachably attached to the attachment member 36, but a bucket can be attached to this attachment member 36 instead of attaching the breaker 26A. In the case where the breaker 26A is detached and the bucket is attached, it is possible to perform an excavation work with the bucket and perform a grasp and/or lifting work with the bucket and the SAM 26B.

The SAM cylinder 27 is arranged along a web of the arm 22 and a tip end of the cylinder rod thereof is coupled to an intermediate portion of the SAM 26B in a longitudinal direction so that the SAM 26B is rotated about the spindle 24 by operating the SAM cylinder 27.

On a back surface (upper surface) side of the boom 19 and the arm 22, there is disposed a hydraulic piping for supplying a pressurized oil to the arm cylinder 21 and the working tool cylinder 23 from a control valve (not shown) provided on the rotating base 14, and on the right and left sides thereof, there is disposed a hydraulic piping 30 for supplying a pressurized oil to the working tool 26 from the control valve. The tip end of the hydraulic piping 30 is connected to oil passage change-over valves 1 disposed on the right and left side surfaces of the arm 22.

The hydraulic piping 30 includes a metal piping 30A disposed on the side surface of the boom 19, a first hose 30B connecting the metal piping 30A and the control valve, a port piping 30C connected to the oil passage change-over valve 1, and a second hose 30D connecting the port piping 30C and the metal piping 30A.

The oil passage change-over valves 1 disposed on the right and left side surfaces of the arm 22 have the same structure and these valves are used in a vertically reversed manner and fixed to the arm 22 via an attachment seat 37.

As shown in FIGS. 1 to 5, each of the oil passage change-over valves 1 is equipped with a valve body 2 of a square block shaped cube and a valve element 4 rotatably inserted in the valve body 2 in the horizontal direction.

Figure 1:
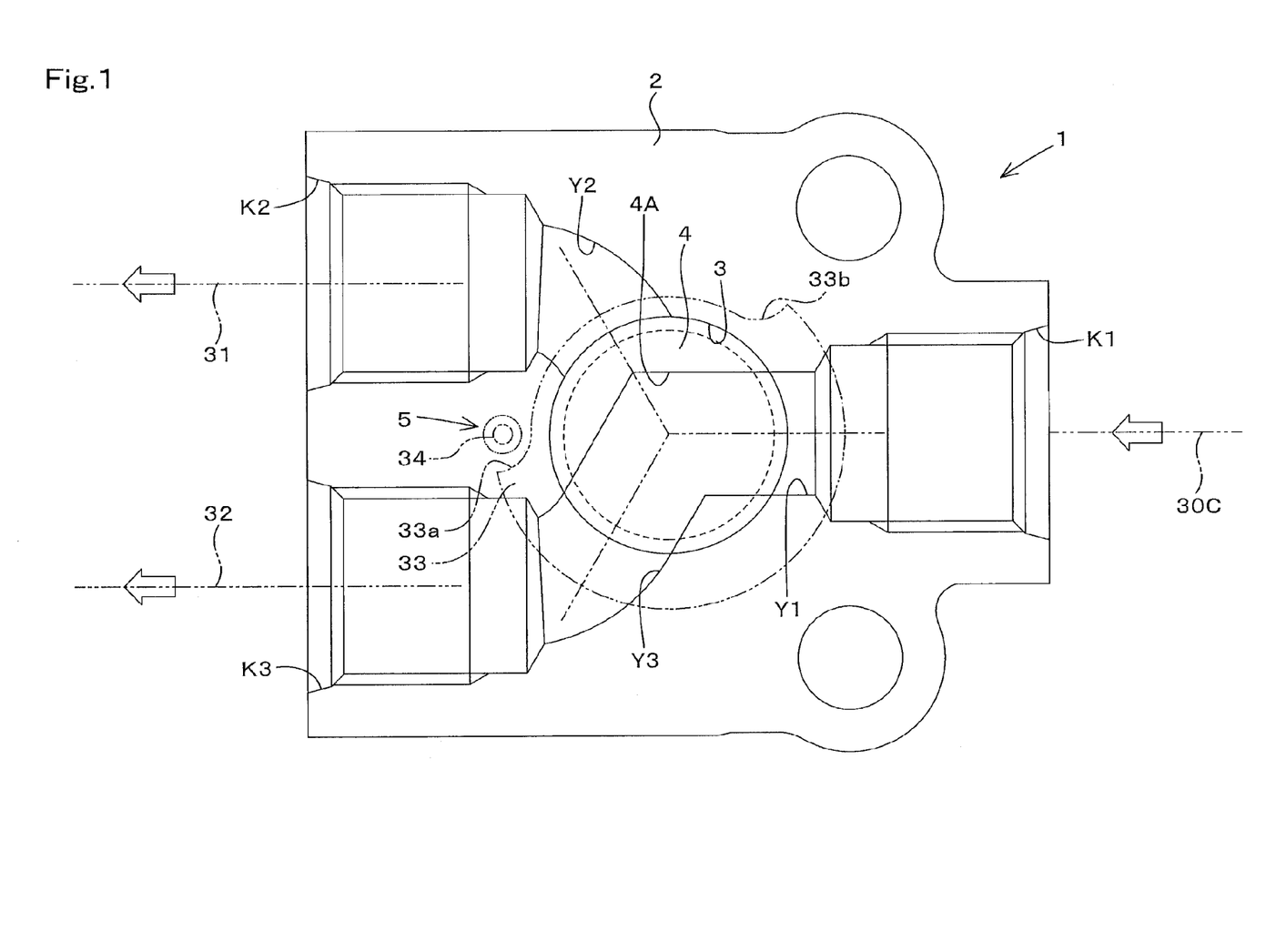
FIG. 1 is a front view in cross section showing an embodiment of the present invention.
Figure 2:
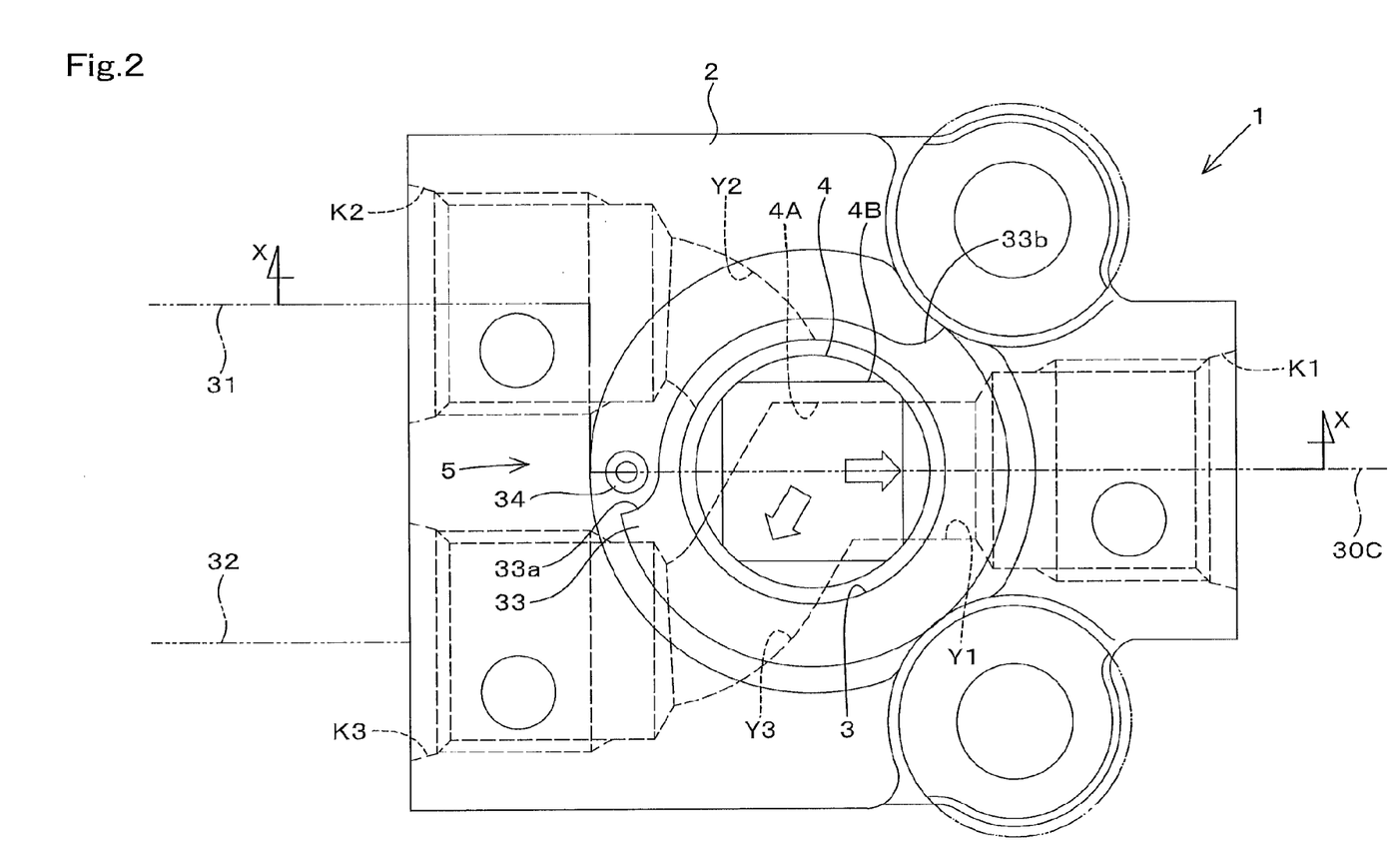
FIG. 2 is a front view of the same.
Figure 3:
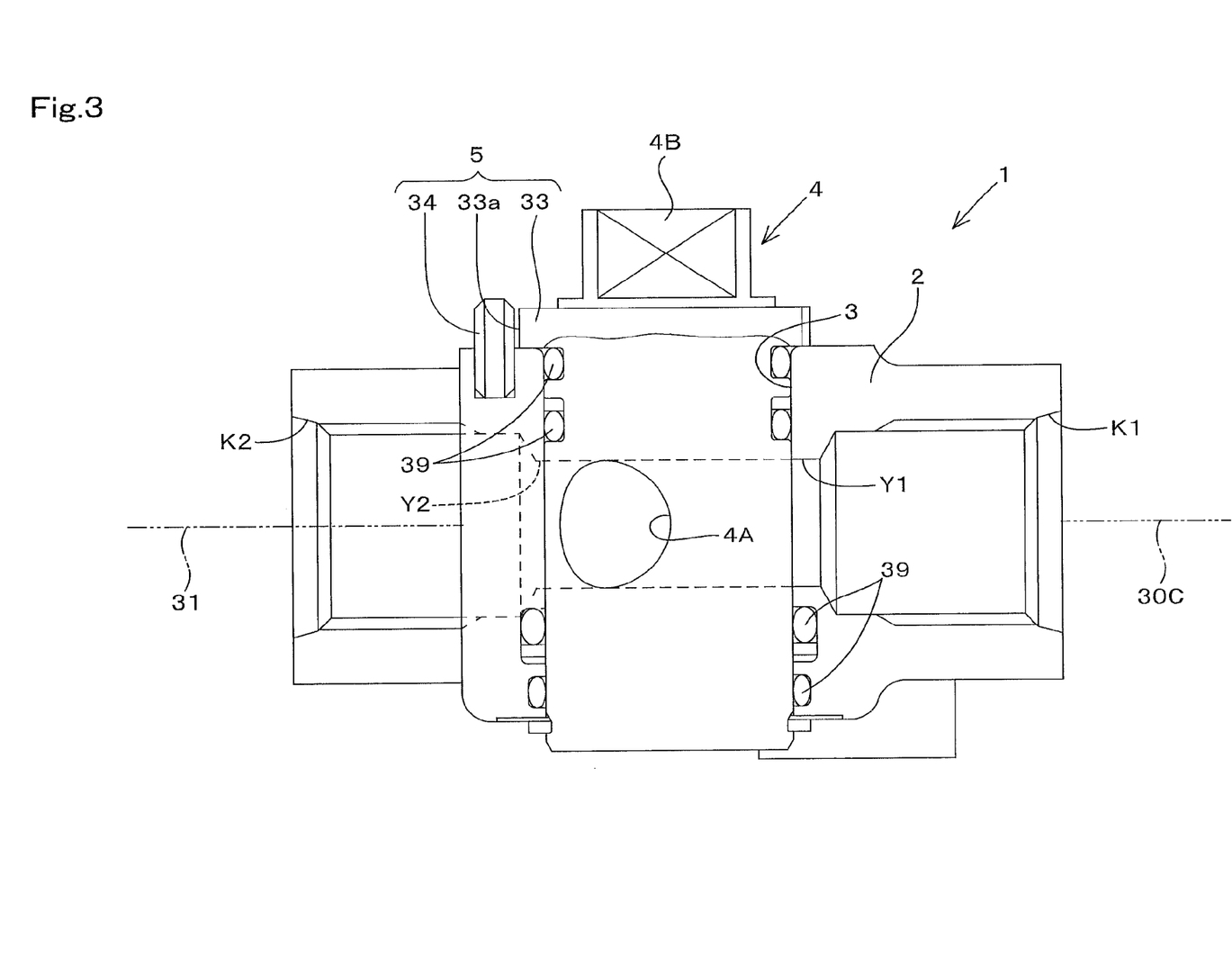
FIG. 3 is a sectional view across a line X-X in FIG. 2.

The valve body 2 includes: a first opening portion K1 which is formed in one side (i.e., opened to a rear surface) thereof and which is connected with the port piping 30C; a second opening portion K2 and a third opening portion K3 both of which are formed in another side (i.e., opened to a front surface) thereof, wherein the second opening portion K2 is connected with the breaker hose 31 of the breaker 26A and the third opening portion K3 is connected with the SAM hose 32 of the SAM cylinder 27, and wherein the second opening portion K2 and the third opening portion K3 are arranged in the front surface of the valve body 2 vertically adjacent to each other with their axial centers positioned in parallel.

Inside the valve body 2, there are formed: a valve hole 3 in a substantially middle position in the back-and-forth direction and in the vertical direction; a first oil passage Y1 connecting the valve hole 3 and the first opening portion K1; a second oil passage Y2 deviated from the first oil passage Y1 by 120 degrees and connecting the valve hole 3 and the second opening portion K2; and a third oil passage Y3 deviated from the first oil passage Y1 by 120 degrees and connecting the valve hole 3 and the third opening portion K3. In specific, the second and third oil passages Y2 and Y3 are positioned at 120 degrees and 240 degrees in a circumferential direction from the first oil passage Y1 and opened to the valve hole 3 at regular intervals.

The valve element 4 is inserted into the valve hole 3, and inside the valve element 4, there is formed a communicating oil passage 4A for alternately communicating the first oil passage Y1 and the first opening portion K1 to the second oil passage Y2 and the second opening portion K2 and the third oil passage Y3 and the third opening portion K3.

Whereas the first oil passage Y1 is formed to be a straight hole, the second oil passage Y2 and the third oil passage Y3 are formed to be arcuately bent from the valve hole 3 to the sides of the second and third opening portions K2 and K3, respectively. By rendering the both oil passages Y2 and Y3 to be bent inwardly opposite to each other, even in the case where the holes of the second and third oil passages Y2 and Y3 are deviated by 120 degrees in the circumferential direction of from the valve hole 3, the second and third opening portions K2 and K3 can be positioned in adjacent to each other with their axial centers being in parallel.

Moreover, in the case where the second and third oil passages Y2 and Y3 are formed to be arcuately bent, a vertical space between the second and third opening portions K2 and K3 can be reduced compared to a case of forming straight holes, and therefore valve body 2 can be formed to be compacted and the weight thereof can be also reduced.

The communicating oil passage (4A) of the valve element (4) is bent by 120 degrees inside the valve element (4) substantially in a chevron in an axial direction view, and therefore, by rotating the valve element 4 by 120 degrees in a counterclockwise direction from a state of communicating with the first and third oil passages Y1 and Y3 shown in FIG. 1, the communication is switched to a state of communicating with the first and second oil passages Y1 and Y2.

The communicating oil passage 4A of the valve element 4 may be arcuately curved inside the valve element 4 and opened to an outer circumferential surface at a position deviated by 120 degrees, and also may be formed to be a concave cut off from the outer circumferential surface to the axial center within a range of substantially 120 degrees of the outer circumferential surface of the valve element 4.

The communicating oil passage 4A and the first to third oil passages Y1 to Y3 are arranged on a surface perpendicularly intersecting with an axial center direction of the valve element 4 and are formed in a range of substantially every 60 degree in the circumferential direction of the valve hole 3 with their opening areas being substantially equal.

The valve element 4 includes a corner shaft portion 4B formed at an end portion protruded from the valve body 2, and by engaging a spanner or a wrench with this corner shaft portion 4B or attaching a handle to the same, the valve element 4 can be rotated.

At the end portion where the corner shaft portion 4B of the valve element 4 is formed, there is formed a flange part 33 having two abutment parts 33a and 33b arcuately cut off the outer circumference in a range of substantially 120 degrees, and an engagement part 34 composed of a spring pin engageable with the abutment parts 33a and 33b is provided on an outer surface of the valve body 2.

The two abutment parts 33a and 33b and the engagement part 34 of the flange part 33 constitute angle setting means 5 for setting a rotation of the valve element 4 by 120 degrees. In this configuration, in the case where the valve element 4 is rotated by substantially 120 degrees from a state of the engagement part 34 being engaged with one abutment part 33a to a state of being engaged with the other abutment part 33b, the communicating oil passage 4A is alternately switched to a state of communicating with the first and third oil passages Y1 and Y3 and a state of communicating with the first and second oil passages Y1 and Y2. Then, the oil passage which does not communicate with the communicating oil passage 4A is closed.

A plurality of oil seals 39 are provided on both sides of the communicating oil passage 4A in the axial center direction of the valve element 4 between the valve body 2 and the valve element 4.

As shown in FIGS. 1, 2, 4 and 5, although the oil passage change-over valve 1 is shown in a state that the second opening portion K2 is located in an upper position than the third opening portion K3 and is attached to the left side surface of the arm 22, in the case where the oil passage change-over valve 1 is attached to the right side surface of the arm 22, the positions are vertically reversed so that the second opening portion K2 is located to be in a lower position than the third opening portion K3.

In the case where the paired oil passage change-over valves 1 having the same structure are disposed on the right and left side surfaces of the arm 22 so as to be used both in an oil supply side and an oil exhaust side, either of the right and left oil passage change-over valves 1 are set in a state that the first oil passage Y1 is positioned at a rear surface side and the second and third opening portions K2 and K3 are positioned at a front surface side while the valve element 4 is protruded in a laterally outward direction while the horizontal attitude thereof remains. That is, the paired oil passage change-over valves 1 disposed either on the right or the left side surfaces of the arm 22 can be connected to the hydraulic piping 30 under the same condition so as to be able to be connected to the breaker 26A and the SAM cylinder 27, respectively.

It is noted that the shapes and respective positional relationships of back and forth, right and left and upper and lower positions of the members in the embodiment of the present invention are the best mode when constituted as shown in FIGS. 1 to 5. However, the present invention is not limited to the above embodiment, and various modifications and combination of the members and configuration can be made.

For example, the oil passage change-over valve 1 may be used for a working machine such as a hydraulic excavator, a wheel loader and the like other that a back hoe in the case of attaching a hydraulic-driven attachment such as a hydraulic hammer and a brush cutter.

In addition, although the oil passage change-over valve 1 is positioned such that the valve element 4 is in a horizontal state, it may be positioned such that the valve element 4 is in a vertical state.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2012-87259 filed on Apr. 6, 2012 is hereby incorporated by reference.

The invention claimed is:

1. An oil passage change-over valve comprising:
  a valve body configured to be attached to an attachment surface, having:
    a first opening portion formed in one side of the valve body, the first opening portion being disposed to arrange an axis of the first opening portion parallel to the attachment surface; and
  a second opening portion and a third opening portion formed in another side of the valve body, the second opening portion and the third opening portion being disposed, arranging an axis of the second opening portion and an axis of the third opening portion parallel to the axis of the first opening portion and to the attachment surface,
  the axis of the second opening portion being located closer to a side of a first surface than the axis of the third opening portion, the first surface being one of two side surfaces of the valve body, the two side surfaces being spaced in a direction parallel to the attachment surface and perpendicular to the axes,
  the axis of the third opening portion being located closer to a side of a second surface than the axis of the second opening portion, the second surface being the other one of the two side surfaces and being opposed to the first surface,
  an end portion of the second opening portion, the end portion of the second opening portion being closer to the second surface, being located closer to the side of the second surface than a first end portion of the first opening portion, the first end portion of the first opening portion being closer to the first surface,
  an end portion of the third opening portion, the end portion of the third opening portion being closer to the first surface, being located closer to the side of the first surface than an second end portion of the first opening portion, the second end portion of the first opening portion being closer to the second surface, the valve body internally including:

a first oil passage for connecting the valve hole with the first opening portion;

a second oil passage deviated by 120 degrees from the first oil passage for connecting the valve hole with the second opening portion; and a third oil passage deviated by 120 degrees from the first oil passage for connecting the valve hole with the third opening portion;

a valve element rotatably provided in the valve hole of the valve body; and a communicating oil passage formed in the valve element for alternately communicating the first opening portion with one of the second opening portion and the third opening portion.

2. The oil passage change-over valve according to claim 1, wherein the communicating oil passage of the valve element is bent by 120 degrees inside the valve element in a chevron in an axial direction.

3. The oil passage change-over valve according to claim 1, comprising:

angle setting means configured to set a rotation of the valve element to 120 degrees.

4. The oil passage change-over valve according to claim 3, wherein the angle setting means is constituted by forming a flange part including two abutment parts each of which is formed by cutting off an outer peripheral portion in an axial end portion of the valve element in an arcuate shape within a range of substantially 120 degrees and providing an engagement portion made of spring pin engageable with the abutment parts on the outer surface of the valve body.

5. The oil passage change-over valve according to claim 1, wherein the valve element includes an angle axis part for a rotation operation in an axial end portion projected from the valve body.

6. The oil passage change-over valve according to claim 1, wherein the valve body is rectangular block shaped having six planes, the first opening portion is formed in one side, and the second and third opening portions are provided with the axial centers thereof in parallel and adjacent to each other in the side opposite to the one side, and the valve hole is formed in a center of a side surface which is in parallel with an arrangement direction of the second and third opening portions, and wherein the second and third oil passages are formed to be arcuately bent in an oppositely inward direction toward the second and third opening parts from the valve hole, respectively.

7. The oil passage change-over valve according to claim 1, wherein the valve body is attached to a side surface of an arm of a working machine, wherein the working machine pivotally supports each proximal end of a boom and a boom cylinder on a travelling machine body and pivotally supports the arm which is driven by an arm cylinder on a tip end of the boom, and a first working tool which is rotated by a working tool cylinder and a second working tool which is rotated by a second working cylinder different from the working tool cylinder are coupled to a tip end of the arm, and wherein the working tool cylinder and the second working cylinder different from the working tool cylinder are connected to the second opening portion and the third opening portion of the valve body via hoses, respectively.

8. An oil passage change-over valve comprising:

a valve body having:

a first opening portion formed in one side of the valve body; and a second opening portion and a third opening portion formed in another side of the valve body, the valve body internally including:

a first oil passage for connecting a valve hole of the valve body with the first opening portion;

a second oil passage deviated by 120 degrees from the first oil passage for connecting the valve hole with the second opening portion; and a third oil passage deviated by 120 degrees from the first oil passage for connecting the valve hole with the third opening portion;

a valve element rotatably provided in the valve hole;

a communicating oil passage formed in the valve element for alternately communicating the first opening portion with one of the second opening portion and the third opening portion, the communicating oil passage of the valve element being bent by 120 degrees inside the valve element in a chevron in an axial direction; and angle setting means configured to set a rotation of the valve element to 120 degrees, the angle setting means including:

an abutment part formed on the end portion in the axial direction of the valve element; and an engagement part disposed on the end portion in the axial direction of an outer surface of the valve body and being engageable to the abutment part, the engagement part being disposed, closer to the another side than the communicating oil passage, between the second opening portion and the third opening portion.

9. The oil passage change-over valve according to claim 8, wherein the valve element includes an angle axis part for a rotation operation in the axial end portion projected from the valve body.

10. The oil passage change-over valve according to claim 8, wherein the valve body is rectangular block shaped having six planes, the first opening portion is formed in one side, and the second and third opening portions are provided with the axial centers thereof in parallel and adjacent to each other in the side opposite to the one side, and the valve hole is formed in a substantially center of a side surface which is in parallel with an arrangement direction of the second and third opening portions, and wherein the second and third oil passages are formed to be arcuately bent in an oppositely inward direction toward the second and third opening parts from the valve hole, respectively.

11. The oil passage change-over valve according to claim 8, wherein the valve body includes:

attachment members, the attachment members being disposed on a side closer to the one side than the communicating oil passage and arranged locating the first opening portion therebetween, and the valve body is attached to a side surface of the arm of a working machine at the attachment member, wherein the working machine pivotally supports each proximal end of a boom and a boom cylinder on a travelling machine body and pivotally supports the arm which is driven by an arm cylinder on a tip end of the boom, and a first working tool which is rotated by a working tool cylinder and a second working tool which is rotated by a second working tool cylinder different from the working tool cylinder are coupled to a tip end of the arm, and wherein the working tool cylinder and the second working tool cylinder different from the working tool cylinder are connected to the second opening portion and the third opening portion of the valve body via hoses, respectively.

12. An oil passage change-over valve comprising:

a valve body configured to be attached to an attachment surface, having:
- a first opening portion formed in one side of the valve body, the first opening portion being disposed to arrange an axis of the first opening portion parallel to the attachment surface; and
- a second opening portion and a third opening portion formed in another side of the valve body, the second opening portion and the third opening portion being disposed to arrange an axis of the second opening portion and an axis of the third opening portion parallel to the axis of the first opening portion and to the attachment surface,
    - the axis of the second opening portion being located closer to a side of a first surface than the axis of the third opening portion, the first surface being one of two side surfaces of the valve body, the two side surfaces being spaced in a direction parallel to the attachment surface and perpendicular to the axes,
    - the axis of the third opening portion being located closer to a side of a second surface than the axis of the second opening portion, the second surface being the other one of the two side surfaces and being opposed to the first surface,
    - an end portion of the second opening portion, the end portion being closer to the second surface, being located closer to the side of the second surface than an end portion of the first opening portion, the end portion being closer to the first surface,
    - an end portion of the third opening portion, the end portion being closer to the first surface, being located closer to the side of the first surface than an end portion of the first opening portion, the end portion being closer to the second surface, the valve body internally including:
        - a first oil passage for connecting a valve hole with the first opening portion; and
        - a second oil passage deviated by 120 degrees from the first oil passage for connecting the valve hole with the second opening portion; and a third oil passage deviated by 120 degrees from the first oil passage for connecting the valve hole with the third opening portion;

a valve element rotatably provided in the valve hole of the valve body;

a communicating oil passage formed in the valve element for alternately communicating the first opening portion with one of the second opening portion and the third opening portion, the communicating oil passage of the valve element being bent by 120 degrees inside the valve element in a chevron in an axial direction; and angle setting means configured to set a rotation of the valve element to 120 degrees, the angle setting means including:
- an abutment part formed on the end portion in the axial direction of the valve element; and an engagement part disposed on the end portion in the axial direction of an outer surface of the valve body and being engageable to the abutment part, the engagement part being disposed, closer to the another side than the communicating oil passage, between the second opening portion and the third opening portion.

* * * * *